Patented June 3, 1952

2,599,315

UNITED STATES PATENT OFFICE 2,599,315

DYNAMOMETER

Winnett Boyd, Leaside, Ontario, and Kenneth Franklin Tupper, East York Township, Ontario, Canada, assignors to The Honorary Advisory Council for Scientific and Industrial Research, Ottawa, Ontario, Canada, a body corporate of Canada Application June 4, 1946, Serial No. 674,191

6 Claims. (Cl. 73—134)

This invention relates to apparatus for measuring the power exerted by a source of energy.

Devices designed for this purpose are commonly known as dynamometers, of which many types have been proposed. Those which are most closely analogous to apparatus embodying our invention are those in which the power to be measured is absorbed by a liquid such as water or mercury. The operating range of such dynamometers is, however, narrow, and we have devised a method for the measurement of power and an apparatus thereof which, through particularly applicable to the measurement of large amounts of power applied to devices operating at high speeds, is not confined to such applications but may be readily adapted for the measurement of power over a very wide range and applied to devices movable at both high and low speeds.

Our invention consists in applying the power to be measured to compress an aeriform fluid (either gas or vapour) by means of a compressor, and controllably varying the density of the supply to the compressor to vary the torque exerted by the compressor shaft at any given compressor speed.

According to our invention the density of the supply to the compressor is preferably maintained by feeding back to the compressor all or a part of the aeriform fluid discharged therefrom, after the heat developed during compression in excess of that required to compensate for heat losses in the cycle has been dissipated. The dissipation of heat developed during compression may be carried out either by means of a heat exchanger, or by exhausting a portion of the hot, compressed aeriform fluid from the circuit and replacing it with an equivalent amount of fluid at a lower temperature, as will be described in detail below in connection with the embodiments of our invention illustrated herein.

The desired density range of the fluid supplied to the compressor will depend upon the amount of power which it is required to absorb by compressing it and consequently increasing its temperature. If the amount of power which it is required so to absorb is high the fluid will be supplied to the compressor at a high density, but if it is necessary only to absorb a small amount of power the density will be low. The mode of construction of appropriate apparatus will depend upon the range of densities at which the apparatus is designed to operate. This range may extend from a fraction of an atmosphere to several atmospheres.

Examples of forms of apparatus adapted for use with a generally adequate range of possible supply densities are shown in the figures as follows.

Figure 1:
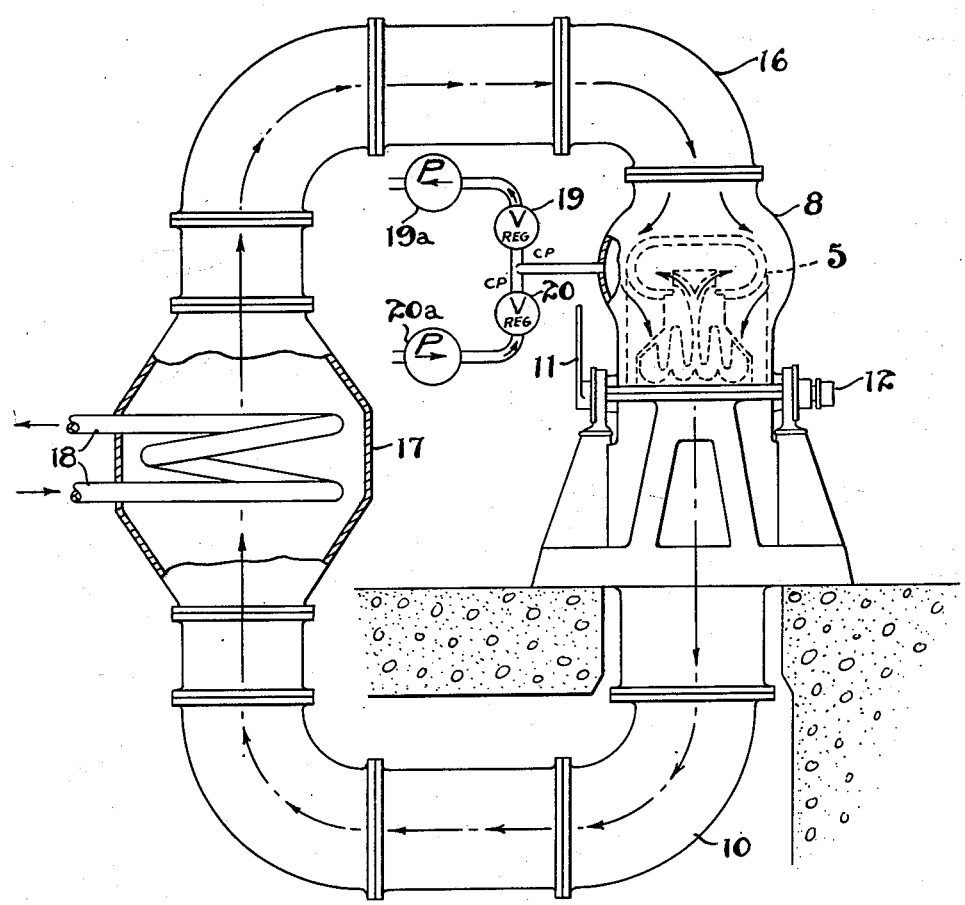
Figure 1 is a diagrammatic view of the apparatus designed for the use of air as the working fluid.
Figure 2:
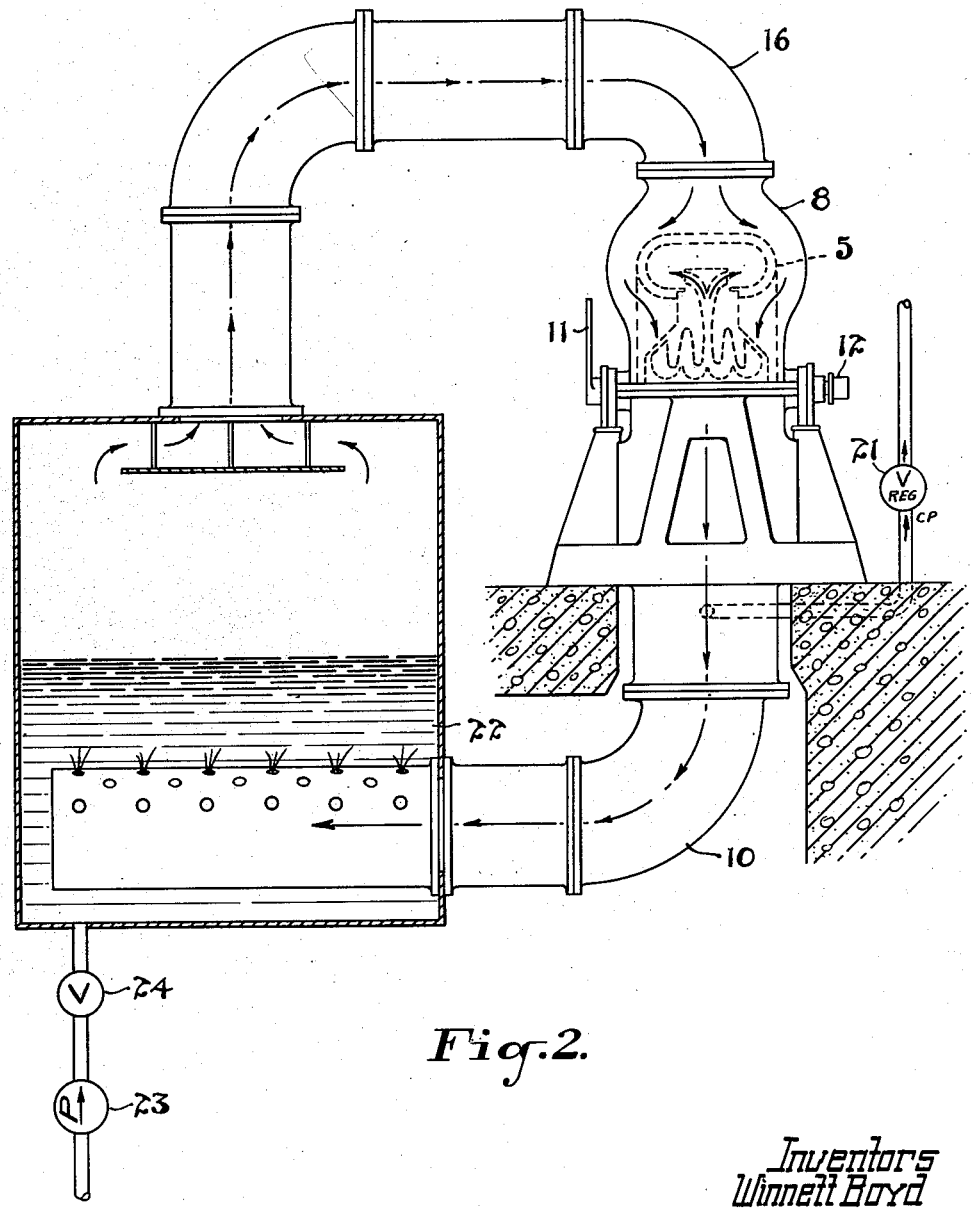
Figure 2 is a corresponding view of an apparatus designed for the use of steam.
Figure 3:
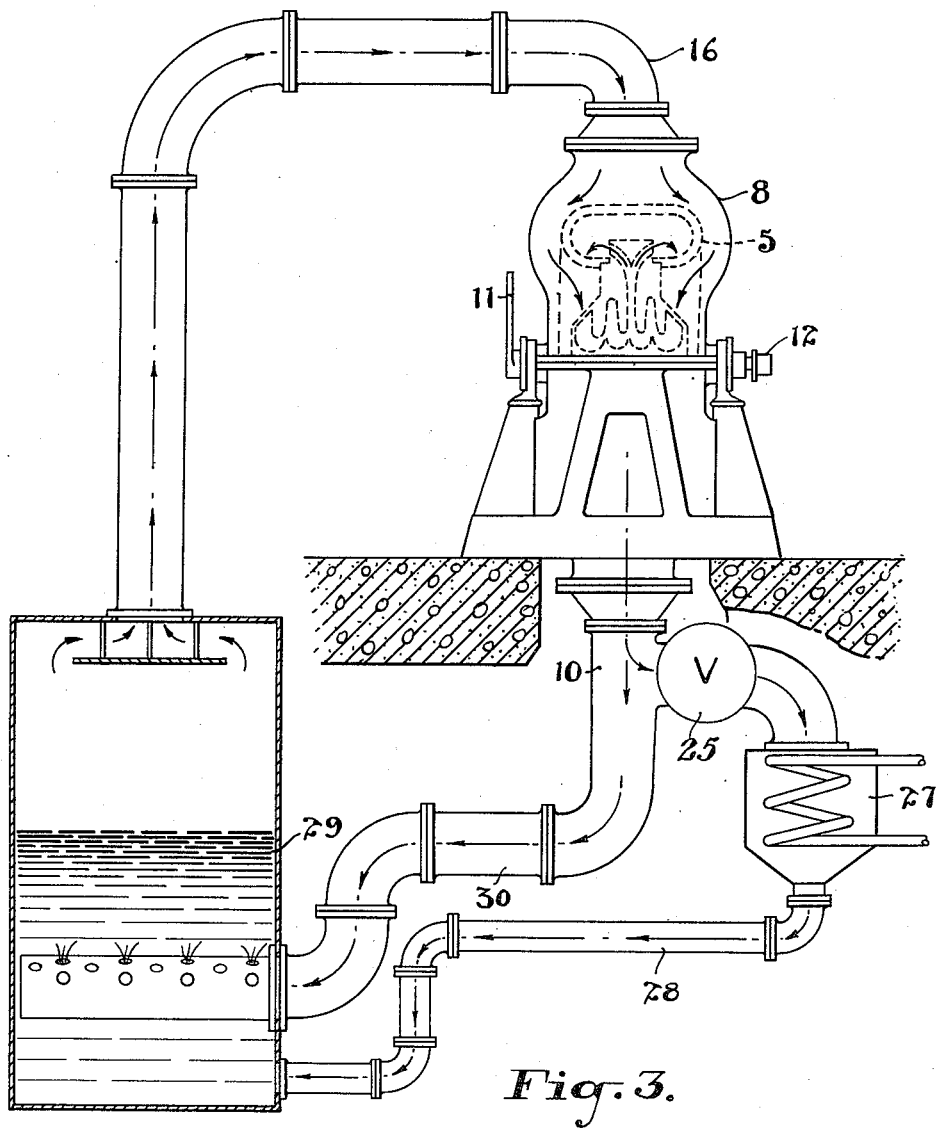
Figure 3 is a similar view of an apparatus designed for the use of a fluid such as dichlorodifluoro methane ($CCl_2F_2$)
Figure 4:
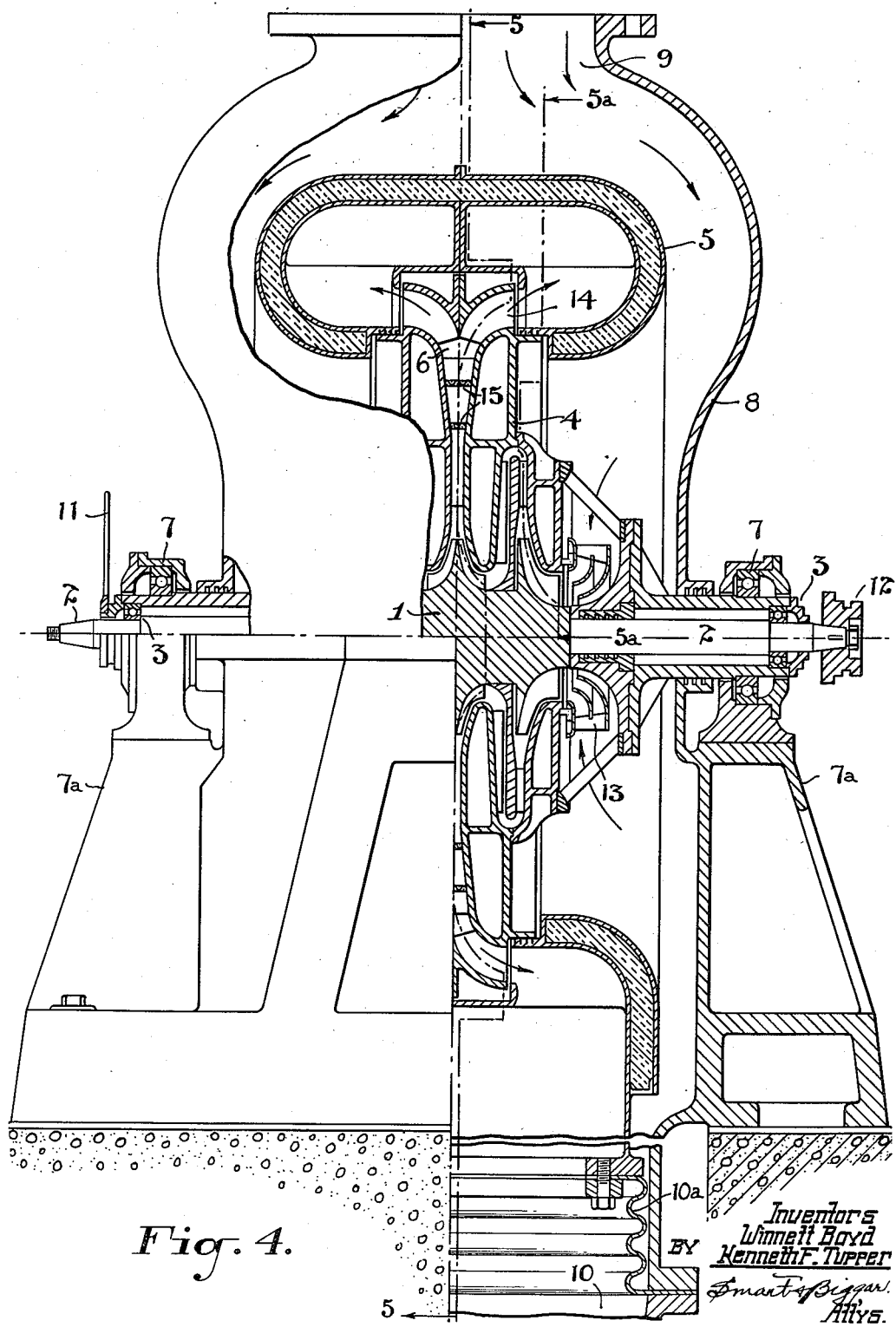
Figure 4 is a vertical section through the compressor element taken along the shaft centre line.
Figure 5:
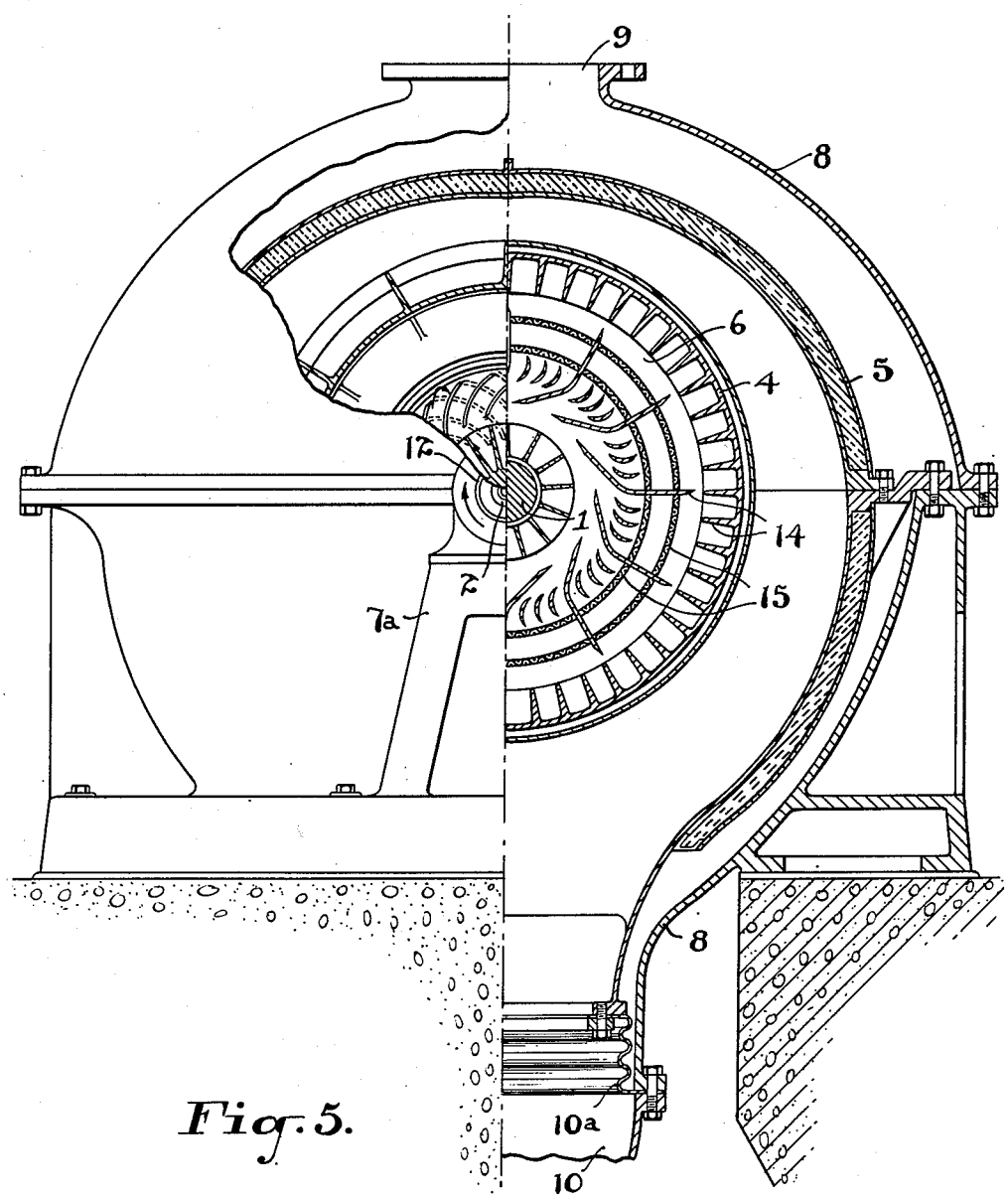
Figure 5 is a vertical section of the compressor element along the line 5—5 in Figure 4.

The compressor shown in Figures 4 and 5 is common to the differing types of apparatus shown in Figures 1, 2 and 3. The impeller 1 is fixed to a shaft 2 supported by bearings 3 within a swung stator casing 4, which encloses the impeller 1 and in turn supports an insulated scroll casing 5 into which the working fluid passes after compression through the passage 6 and from which it is discharged. The swung stator casing 4 and scroll casing 5 are rotatable within restricted limits about a central axis coinciding with the centre line of the impeller and shaft assembly, being mounted on bearings 7 and pedestals 7A. Except at the point of the entry and discharge of the working fluid therefrom, the scroll casing 5 is surrounded by an outer casing 8 connected at one end 9 to a supply conduit and at the other to a return conduit 10 by an expansion type seal 10A. From the swung stator casing 4 there extends an arm 11, to which is attached a torque meter (not shown) and which prevents the rotation of the stator casing 4 beyond predetermined limits. To the shaft 2 there is also attached a tachometer (not shown) for determining the speed of rotation of the shaft.

The shaft 2 is adapted to be connected to the source of power to be measured by means of a coupling 12 and with a selected density, temperature and flow of the working fluid to the compressor the power exerted by the source of energy may be calculated in the usual way by reference to the torque meter and tachometer readings.

The swung stator casing 4 contains inlet guide vanes 13 for controlling the entry of the fluid into the compressor in the direction indicated by the arrows, and also discharge guide vanes 14 and straightening screens 15 for guiding the discharge of the fluid therefrom. These are preferably so formed that the fluid enters and leaves the swung stator casing 4 without any tangential velocity component, thus causing the time rate of change of the angular momentum of the fluid to be substantially nil and ensuring that the torque applied to the impeller 1 is equal to the torque reaction on the swung stator casing 4.

Referring now to Figure 1, in which the compressor is shown diagrammatically, air at a given density in the supply conduit 16 flows as indicated by the arrows between the outer casing 8 of the compressor and the scroll casing 5. It is compressed in passing through the compressor and passes into the return conduit 10. Through a heat exchanger 17 water, air or other coolant is passed through appropriate connections, indicated at 18, to withdraw the heat developed during compression from the air which then passes to the supply conduit 16. The initial density of the air in the supply conduit 16 is obtained by means of the adjustable automatic valves 19 and 20, of which one is connected with a vacuum pump 19a and the other with a compressor 20a. By means of these valves any slight variations of the density, due to leakage, of the air returned to the supply conduit 16 through the heat exchanger 17 may be compensated.

Referring to Figure 2, the steam at a given density flows from the supply conduit 16 through the compressor into the return conduit 10 equipped with an adjustable automatic valve 21, through which there is released to the atmosphere such portion of the steam discharged from the compressor as is not required to maintain the required density in the supply conduit 16. The remainder passes into a body of water 22 maintained at a constant level by means of the pump 23 and the adjustable valve 24.

Figure 3 shows the arrangement for the use of a fluid such as dichloro-difluoro methane. Here the return conduit 10 is provided with adjustable pressure valve 25. Through the valve 25 that part of the fluid not required to maintain the desired density of the fluid in the supply conduit 16 is passed to a heat exchanger 27 in which it is liquefied and passes through the conduit 28 in liquid form to a body of the liquid 29. The remainder of the fluid passes through the conduit 30 and is released into the body 29 of the fluid to vaporize sufficient thereof to maintain the predetermined density in the supply conduit 16. The operation of the valve 25 may be automatically controlled by the fluid pressure in the conduit 16.

We claim:

1. Apparatus for measuring the power of a source of energy comprising, a compressor for aeriform fluid operable by said source of energy and having an intake port and a discharge port, said compressor and said source of energy being arranged so that the power transferred to said compressor from said source of energy may be measured, means for dissipating heat developed during compression of said fluid, a main conduit for said fluid arranged to feed back at least a substantial part of said fluid from the discharge port of the compressor to its intake port, and means for maintaining the pressure in the main conduit substantially constant including a source of aeriform fluid pressure differing from that in the main conduit, and means providing an adjustable fluid flow passage between the main conduit and said source of aeriform fluid pressure.

2. Apparatus for measuring the power of a source of energy having a rotatory drive shaft, comprising a compressor for aeriform fluid operable by said drive shaft and having an intake port and a discharge port, said compressor having a rotor and a swung stator arranged so that said fluid upon discharge from the rotor and the stator has substantially no tangential velocity relative to the rotor and stator, means for indicating the speed of shaft rotation and the torque exerted on the swung stator by said drive shaft, a main conduit for said fluid arranged to feed back at least a substantial part of said fluid from the discharge port of the compressor to its intake port, means for dissipating heat developed during compression of said fluid, and means for maintaining the pressure in the main conduit substantially constant including a branch conduit connected through a regulating valve to the main conduit and to a source of aeriform fluid pressure differing from the pressure in the main conduit at the point of connection.

3. Apparatus as defined in claim 2 in which the means for maintaining the pressure in the main conduit substantially constant includes two regulating valves, one connected to a source of lower aeriform fluid pressure than that in the main conduit and the other connected to a source of higher pressure.

4. Apparatus as defined in claim 2 in which the aeriform fluid is steam, and the means for maintaining the pressure in the main conduit substantially constant includes a regulating valve for the escape to the atmosphere of part of the aeriform fluid after compression and also includes a body of water maintained at a substantially constant level through which the remainder of the aeriform fluid is passed.

5. Apparatus as defined in claim 2 in which the aeriform fluid is one which is liquifiable upon cooling, and the means for maintaining the pressure in the main conduit substantially constant includes a regulating valve arranged to divert part of said fluid from the main conduit through the branch conduit to a heat exchanger adapted to liquify said fluid and from which the branch conduit conducts the fluid in liquid form into a body of said fluid in liquid form, the main conduit being arranged to conduct the remainder of said aeriform fluid into said body of said fluid in liquid form.

6. Apparatus as defined in claim 5 in which the aeriform fluid is dichloro-difluoro methane.

WINNETT BOYD.
KENNETH FRANKLIN TUPPER.

REFERENCES CITED

The following references are of record in the file of this patent:

UNITED STATES PATENTS

| Number | Name | Date |
| --- | --- | --- |
| 1,642,095 | Tracy | Sept. 13, 1927 |
| 1,704,412 | Tracy | Mar. 5, 1929 |
| 2,014,684 | Junkers | Sept. 17, 1935 |
| 2,452,550 | Cline | Nov. 2, 1948 |

FOREIGN PATENTS

| Number | Country | Date |
| --- | --- | --- |
| 313,484 | Germany | July 14, 1919 |